No. 732,090. Patented June 30, 1903.

UNITED STATES PATENT OFFICE.

IVAN LEVINSTEIN AND HERBERT LEVINSTEIN, OF MANCHESTER, ENGLAND, ASSIGNORS TO LEVINSTEIN, LIMITED, OF MANCHESTER, ENGLAND.

BLUE SULFUR DYE AND PROCESS OF MAKING SAME.

SPECIFICATION forming part of Letters Patent No. 732,090, dated June 30, 1903.

Application filed June 10, 1902. Serial No. 111,022. (No specimens.)

*To all whom it may concern:*

Be it known that we, IVAN LEVINSTEIN and HERBERT LEVINSTEIN, Ph. D., subjects of the King of Great Britain and Ireland, residing at Manchester, in the county of Lancaster, England, have invented new and useful Improvements in Blue Sulfur Dyestuff and Processes of Making Same, of which the following is a specification.

It is well known that certain mono-alkyl-leuco-indophenols when treated with sodium sulfid and sulfur under suitable conditions yield blue dyestuffs which dye unmordanted cotton bright blue shades, which are not very fast either to light or to washing.

We have discovered a process for preparing chlorinated mono-alkyl-leuco-indophenols and that these when treated under suitable conditions with sodium sulfid and sulfur yield dyestuffs which are in general similar to the corresponding unchlorinated dyestuffs, but are greatly superior to them both in fastness to light and to washing.

Our mode of preparation is illustrated by the following examples:

*Example I. Preparation of para-ethyl-amidometatolyl-paraoxymeta-chlorophenylamin.*—6.75 kilos of ethyl-orthotoluidin are added, with stirring, to a solution of 7.2 kilos of ortho-chloropara-amidophenol (melting-point 153° centigrade) in 12.5 kilos of concentrated sulfuric acid (66° Baumé) and two hundred liters of water. A solution of 12.5 kilos of potassium bichromate in one hundred and fifty liters of water is now added in the cold and with good stirring in order to form an indophenol. The latter substance is then precipitated with soda, filtered off, and washed. It is then stirred into a paste with one hundred and thirty liters of water and reduced with a cold solution of twenty-five kilos of sodium sulfid and one hundred and twenty-five liters of water. When the reduction is complete, the solution is heated to 70° centigrade and filtered. From the filtrate para-ethyl-amidometatolyl-paraoxymeta-chlorophenylamin is precipitated by means of sodium bicarbonate and may be directly employed for the production of a blue dyestuff.

Analogous chlorinated derivatives of leuco indophenol may be similarly prepared by substituting in the above example equivalent amounts of orthotoluidin or paraxylidin for the ethyl-orthotoluidin. A very similar result is obtained if for ethyl-orthotoluidin an equivalent amount of methyl- or other alkyl-orthotoluidin be taken.

*Example II.*—Ten kilos of para-ethyl-amidometatolyl-paraoxymeta-chlorophenylamin, prepared as described under Example I, are added to a solution containing twenty kilos of sulfur, fifty kilos of crystallized sodium sulfid, and thirty liters of water. The mixture is concentrated by boiling down until the boiling-point is 115° centigrade and is then heated to that temperature for about twenty-four hours in a pan provided with a reflux condenser. After the reaction is over the dyestuff is precipitated most advantageously by blowing in a current of air and is filtered off, dried, and finely ground. It is thus obtained in the form of a blue powder readily soluble in concentrated sulfuric acid with blue color and in caustic-soda solution with red-violet color, but is practically insoluble in water or alcohol. The solution in sodium sulfid is colorless.

The dyestuff dyes unmordanted cotton from a bath containing sodium sulfid very bright indigo-blue shades, which are very fast to washing and to light.

What we claim as our invention, and desire to secure by Letters Patent, is—

1. The process of producing blue sulfur dyestuffs which consists in oxidizing together orthochloropara-amidophenol and mono-alkylorthotoluidin to form an indophenol, reducing the same and thereby producing para-mono-alkyl-amidometatolylparaoxymeta-chloroparaoxyphenylamin having the probable constitution

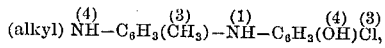

and which is a white powder sparingly soluble in alcohol and in water, very sparingly soluble in benzene, and which turns blue on exposure to the atmosphere, and heating the intermediate product thus obtained with sulfur and an alkali sulfid, substantially as set forth.

2. The new blue sulfur dyestuff prepared from paramonoalkylamidometatolyl-paraoxymetachlorophenylamin, which dyestuff in the dry state is a blue substance soluble in concentrated sulfuric acid with blue color, in caustic soda with a red-violet color, and which dyes unmordanted cotton in bright indigo-blue shades of great fastness both to light and to washing, substantially as set forth.

In testimony whereof we have signed our names to this specification in the presence of two subscribing witnesses.

IVAN LEVINSTEIN.
HERBERT LEVINSTEIN.

Witnesses to the signature of Ivan Levinstein:
WM. F. COOPER,
WILLIAM E. HEYS.

Witnesses to the signature of Herbert Levinstein:
WILLIAM E. HEYS,
ARTHUR MILLWARD.